No. 833,154. PATENTED OCT. 16, 1906.
C. D. BRADT.
HYGROMETER.
APPLICATION FILED AUG. 6, 1906.
2 SHEETS—SHEET 1.
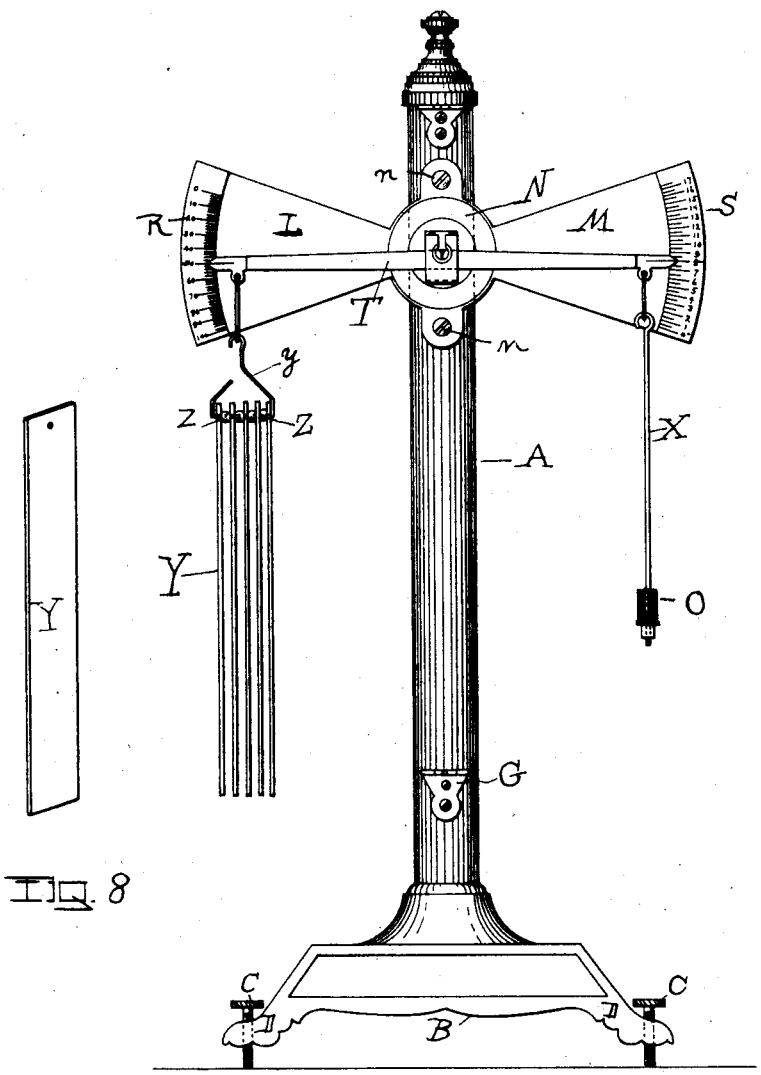

No. 833,154. PATENTED OCT. 16, 1906.
C. D. BRADT.
HYGROMETER.
APPLICATION FILED AUG. 6, 1906.
2 SHEETS—SHEET 2.
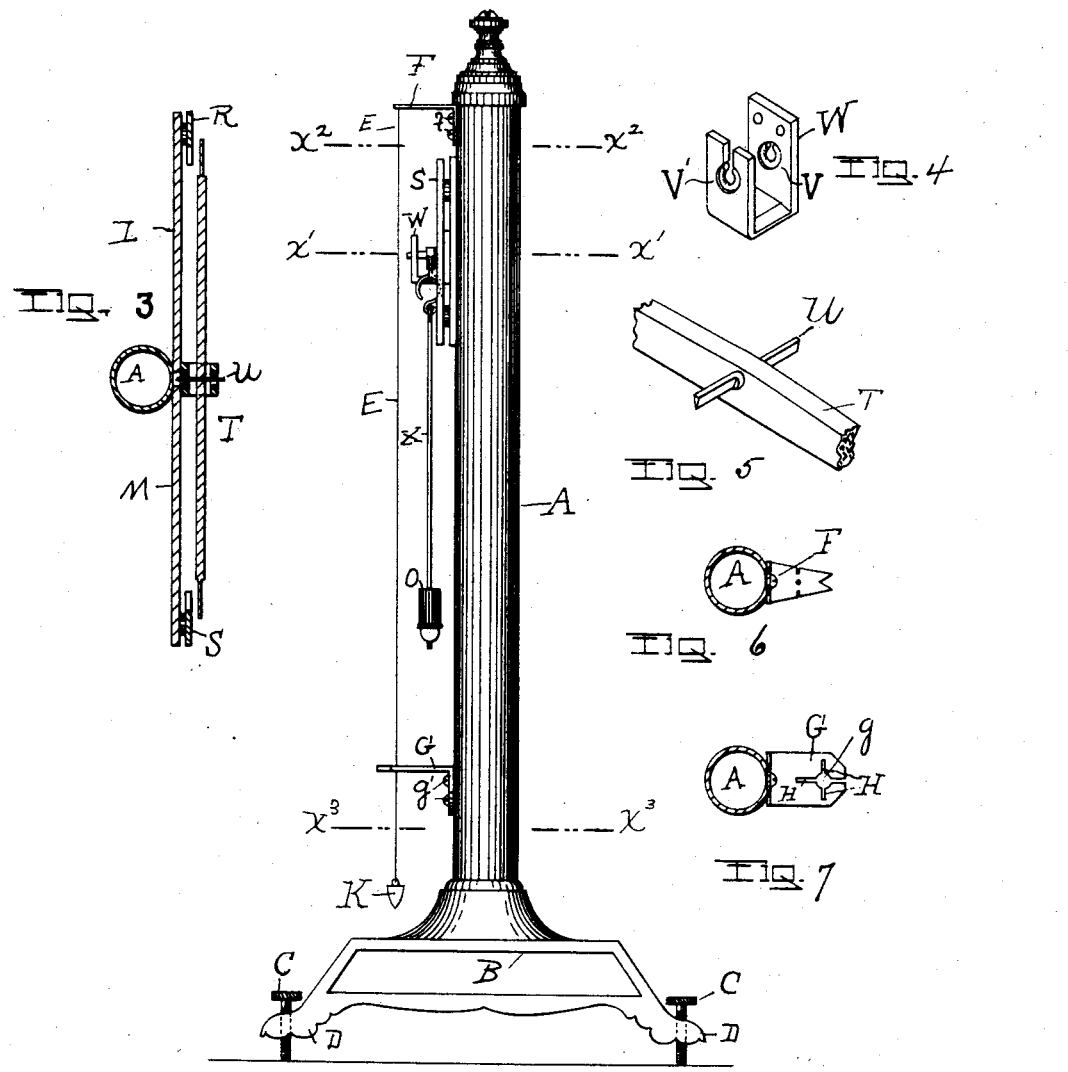

UNITED STATES PATENT OFFICE.

CHAUNCEY D. BRADT, OF TROY, NEW YORK.

HYGROMETER.

No. 833,154.  Specification of Letters Patent.  Patented Oct. 16, 1906.

Application filed August 6, 1906. Serial No. 329,305.

*To all whom it may concern:*

Be it known that I, CHAUNCEY D. BRADT, a citizen of the United States, residing at the city of Troy, in the county of Rensselaer and State of New York, have invented certain new and useful Improvements in Hygrometers, of which the following is a specification.

My invention relates to hygrometers; and the object of my invention is to provide a sensitive inexpensive mechanism for measuring the comparative moisture of the air and determining and registering the humidity of the atmosphere. I accomplish this object by means of the mechanism illustrated in the accompanying drawings, in which—

Figure 1 is a front elevation with the plummet-line removed. Fig. 2 is a side elevation; Fig. 3, a section along the line X' X' on Fig. 2; Fig. 4, an enlarged view of the bracket and bearings for indicating-arm; Fig. 5, an enlarged view of the pivot for indicating-arm. Fig. 6 is a section along the lines X² X² on Fig. 2 looking up. Fig. 7 is a section along the line X³ X³ on Fig. 2 looking up; Fig. 8, a view of one of the attractors.

Similar letters refer to similar parts throughout the several views.

For the purpose of determining the amount of humidity in the atmosphere I have provided a mechanism whereby one end of the scale-beam is provided with a suitable substance for attracting moisture, and thereby becoming heavier in proportion to the amount of moisture absorbed or attracted to it, the other end of the scale-beam adapted to receive suitable weights for the purpose of counterbalancing the attracting material when the attracting material is artificially dried to the zero-point.

For the purpose of registering the result of my mechanism I preferably place a scale adjacent to that end of the scale-beam which carries the attracting material and which is preferably pointed to form an indicator. This scale is preferably graduated from zero degrees to one hundred degrees, which form the extreme of dryness and wetness, the zero degree obtaining when the absorbing material is artificially dried and the one hundred degree when the air is absolutely saturated with moisture. The intervening space is then divided into one hundred parts. I also place adjacent to the opposite end of the scale-beam, which is also pointed, a scale to indicate, preferably in grains, the weight of a cubic inch of the moisture (the absorbing material being equal to a cubic inch in extent) absorbed by the attracting element.

Referring to the drawings, I mount a suitable standard A upon the pedestal B and preferably place the set-screws C through the feet D of the pedestal for the purpose of raising and lowering the same to cause the standard A to assume a true perpendicular. I preferably mount near the top of the standard A one end of a plummet-line E by means of a right-angled plate F, secured to the side of the standard by suitable screws $f$ or in any convenient manner, and cause the plummet-line to pass through opening $g$ in the plate G, secured to the standard A by means of suitable screws $g'$ or in any convenient manner. The plate G is preferably placed near the bottom of the standard A, so adjusted that when the plummet-line E passes through the center of the opening $g$ the standard A will be perpendicular. For the purpose of allowing for the adjustment of the standard I preferably place the radiating slots H, registering with the center opening $g$, in the plate G. The plummet-line E has attached to the end thereof the plummet K.

Secured to the standard A, I arrange the scale-arms L and M, which are preferably pieces of thin metal flaring outwardly from a center circular portion N, which center portion is secured, by means of the screws $n$ $n$, to the standard A. Along the curved outer flaring surface of the scale-arm L, I place the scale R, which is preferably a curved piece of metal secured to the scale-arm L in any suitable manner, as shown in Fig. 3, upon which are gradations numbering from zero to a hundred. The scale-arm M carries a scale S, which is preferably a curved piece of metal secured to the scale-arm M, in any suitable manner, as shown in Fig. 3, and which is preferably provided with gradations numbering from zero, preferably, to seventeen, for the purpose of indicating in grains the weight of a cubic inch of the moisture absorbed by the absorbing material. Of course I do not limit myself to the number of gradations on either scale, nor to the indicating references connected therewith.

Scale-beam T is provided with a knife-edged bar U, preferably extending to the point midway between the ends thereof and resting in the openings V V' of the bracket W when the bracket is secured to the circular portion N, connecting the scale-arms L and M. Adjacent to one end of the scale-beam T, I detachably mount a series of absorbing-cards Y, which may be threaded on a wire y, as shown in Fig. 1, the members being preferably spaced separate from each other by suitable disks Z, the extent of the absorbing material being preferably equal to a cubic inch. The opposite end of the scale-beam T is provided with a detachable rod X, which carries a weight O, the rod, attachment, and weight O causing the scale-beam T to register with zero on the scale S, when the absorbing material, free from moisture, registers with the zero-point on the scale R.

The operation of my invention is as follows: When the absorbing material is absolutely dry, taken from the oven, the moisture abstracted therefrom, and placed on the scale-beam, a weight is placed on the opposite side of the scale-beam to cause each end of the scale-beam to register at zero on their respective scales. As moisture is absorbed the absorbing material becomes heavier and raises the opposite scale-beam the amount in grains indicated by the scale S adjacent thereto. As the absorbing material equals in extent a cubic inch, the amount per cubic inch in grains will be shown, the amount of the proportion of the humidity or moisture in the room being indicated by the scale adjacent to the end of the scale-beam carrying the absorbing material.

What I claim as my invention, and desire to secure by Letters Patent, is—

1. A hygrometer consisting of a standard suitably supported; a means for adjusting the same to a true perpendicular; a scale-beam; a means for mounting the scale-beam in connection with said standard; absorbing material detachably secured to one end of said scale-beam; a weight detachably secured to the opposite end of said scale-beam; a means for indicating both the degree of moisture in the atmosphere and the weight thereof, substantially as described.

2. In a hygrometer; a standard; a scale-beam mounted in connection therewith; absorbing material carried by said scale-beam; an indicating-scales adjacent to each end of said scale-beam, respectively; a means for indicating on one scale the proportion of moisture in the atmosphere and by the other scale the weight of said moisture.

3. In a hygrometer; a standard; means for adjusting said standard to cause it to assume a true perpendicular; a plummet-line suspended from said standard; a scale-beam; a knife-edged bar connected therewith; a bracket attached to said standard with which said knife-edged bar registers; scale-arms attached to said standard; indicating-scales secured to said arm; absorbing material attached to one end of said scale-arm; a weight attached to the other end thereof, all substantially as described.

In testimony whereof I have affixed my signature in presence of two witnesses.

CHAUNCEY D. BRADT.

Witnesses:
FREDERICK W. CAMERON,
LUCIA C. DAMARELL.